(12) United States Patent
Parker et al.

(10) Patent No.: US 7,625,985 B1
(45) Date of Patent: Dec. 1, 2009

(54) WATER-BASED PROCESS FOR THE PREPARATION OF POLYMER-CLAY NANOCOMPOSITES

(75) Inventors: Dane Kenton Parker, Coshocton, OH (US); Xiaoping Yang, Streetsboro, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 635 days.

(21) Appl. No.: 11/592,064

(22) Filed: Nov. 2, 2006

Related U.S. Application Data

(60) Provisional application No. 60/753,111, filed on Dec. 22, 2005.

(51) Int. Cl.
*C08L 53/00* (2006.01)
*C08K 3/00* (2006.01)

(52) U.S. Cl. .................. 525/446; 524/445; 524/555; 524/458

(58) Field of Classification Search ............ 524/445, 524/446, 555, 458
See application file for complete search history.

(56) References Cited

U.S. PATENT DOCUMENTS

| | | | | |
|---|---|---|---|---|
| 4,431,755 A | 2/1984 | Weber et al. | ................. | 523/203 |
| 4,739,007 A | 4/1988 | Okada et al. | ................. | 524/789 |
| 4,810,734 A | 3/1989 | Kawasumi et al. | .......... | 523/216 |
| 5,385,776 A | 1/1995 | Maxfield et al. | ............ | 428/297 |
| 5,578,672 A | 11/1996 | Beall et al. | .................. | 524/446 |
| 5,840,796 A | 11/1998 | Badesha et al. | ............. | 524/449 |
| 5,910,523 A * | 6/1999 | Hudson | ..................... | 523/213 |
| 6,727,311 B2 * | 4/2004 | Ajbani et al. | ................ | 524/447 |
| 6,759,464 B2 | 7/2004 | Ajbani et al. | ............... | 524/445 |
| 6,861,462 B2 | 3/2005 | Parker et al. | ................ | 524/445 |
| 2004/0162379 A1 | 8/2004 | Ajbani et al. | ............... | 524/447 |
| 2005/0020753 A1 | 1/2005 | Ajbani et al. | ............... | 524/445 |
| 2005/0065266 A1 | 3/2005 | Yang et al. | .................. | 524/445 |

FOREIGN PATENT DOCUMENTS

| | | |
|---|---|---|
| EP | 1321489 | 6/2003 |
| WO | 9700910 | 1/1997 |
| WO | 2004078785 A1 | 9/2004 |
| WO | 2004078839 A1 | 9/2004 |

OTHER PUBLICATIONS

Chem. Mater: 2001, vol. 13, pp. 3436-3448, *Synthesis of Nanocomposite Organic/Inorganic Hybrid Materials Using Controlled/"Living" Radical Polymerization*, Published on Web Aug. 3, 2001.

Internet Article, pp. 1-9, "Polymer Layered Silicate Nanocomposites," by Marco Zanetti, et al., Macromol.Mater.Eng. 279, *Wiley-VCH Verlag GmbH*, published 2000.

* cited by examiner

*Primary Examiner*—Kelechi C Egwim
(74) *Attorney, Agent, or Firm*—John D. DeLong

(57) ABSTRACT

This invention relates to an aqueous based process for the preparation of intercalated and/or exfoliated natural or synthetic clays using block copolymers in latex form containing at least one non-polar block and one or more cationic blocks, wherein the block copolymers are prepared by an emulsion controlled free radical polymerization method.

20 Claims, No Drawings

WATER-BASED PROCESS FOR THE PREPARATION OF POLYMER-CLAY NANOCOMPOSITES

CROSS REFERENCE TO OTHER APPLICATIONS

This Application claims the benefit of Ser. No. 60/753,111 filed Dec. 22, 2005.

BACKGROUND OF THE INVENTION

The addition of fillers to polymers is a common industrial practice. Its purpose is generally twofold; to reduce the overall cost of the composite while concurrently bringing about improvement in, for example, mechanical properties such as wear, hardness, tensile modulus, tear etc. It is also known that by using filler particles of very small dimensions (<200 nm), polymer composite properties may be improved with a much lower concentration of filler, typically 2 to 10 parts by weight per 100 parts by weight of rubber compared to 30 to 100 parts by weight per 100 parts by weight of rubber with normally micron sized filler particles. Nanometer or "nano-scale" fillers possess extremely high surface area with high surface energy. For this reason, it is important that this surface energy be overcome or dissipated in some manner to allow efficient compatibilization and dispersion of the nano-filler into the polymeric substrate to avoid filler aggregation during processing and finishing of the final product.

Formation of organic-inorganic nanocomposites based on clays or layered silicates such as montmorillonite is known. Generally, these clays are normally modified by alkyl ammonium ions or amines through an ion-exchange process. The large organic ions displace the smaller inorganic ions (e.g. sodium ion) that reside between the negatively charged silicate platelets thus expanding the interplate distances while concurrently making the modified clay more hydrophobic. The end result is a modified clay that is more readily dispersible in a polymeric substrate. In some instances, the new nanocomposite has an intercalated structure wherein the clay is well dispersed with no large aggregates but still largely retains its layered (but expanded) domain morphology. The expanded layered structure will allow some of the polymeric substrate to interpenetrate between the stacked platelets which, in turn, often results in physical property improvements. While the intercalated polymer-clay domain structure is an improvement, it does not reach the ultimate state of dispersion commonly referred to as exfoliation. When an exfoliated state is achieved as evidenced by a complete lack of an X-ray diffraction pattern, the layered structure of the clay is completely disrupted. Individual platelets in this state now have little affinity for each other relative to the polymeric substrate. The attainment of the exfoliated state will provide the most improvement in properties with the lowest level of filler possible.

SUMMARY OF THE INVENTION

The present invention is directed to a method of preparing a nanocomposite comprised of an elastomer and at least partially exfoliated platelets from a water-swellable clay which comprises blending:

(A) an aqueous latex comprised of an amphiphilic block copolymer prepared by
  (1) preparing a first aqueous polymerization medium which is comprised of
    (a) 4-vinylpyridine,
    (b) a trithiocarbonate RAFT agent, and an emulsifier, wherein the emulsifier is prepared in-situ within the aqueous polymerization medium by the reaction of a latent surfactant with a surfactant activator;
  (2) polymerizing the 4-vinylpyridine within the first aqueous polymerization medium in the presence of a first free radical initiator to produce a poly(4-vinylpyridine);
  (3) protonating the poly(4-vinylpyridine) to form a protonated poly(4-vinylpyridine) RAFT macroinitiator;
  (4) preparing a second aqueous polymerization medium which is comprised of the protonated poly(4-vinylpyridine) RAFT macroinitiator and a monomer containing ethylenic unsaturation but is exclusive of a surfactant; and
  (5) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation;

(B) an aqueous mixture of water and a multilayered water-swellable clay which contains cationically exchangeable ions in its galleries between said layers, exclusive of an intercalant for said clay, wherein said water-swellable clay is comprised of a plurality of stacked platelets with water-swollen galleries between said platelets, wherein said galleries contain cationic ion exchangeable ions therein.

DESCRIPTION OF THE INVENTION

One technique for obtaining an exfoliated polymer-clay nanocomposite structure is to use a polymeric substrate or an additive with common structural features to the polymeric substrate that bears an ion-exchangeable cationic (positive) charge. In this way, the cationic portion of the block copolymer can exchange with the inorganic cations associated with the clay. The non-polar portion of the block copolymer with a much higher molecular mass will then separate and surround the individual clay platelets, effectively making the surface energy of the nanocomposite particle the same as the bulk polymeric substrate.

The exfoliation process for this invention is conducted to the exclusion of a conventional anionic, cationic, or nonionic surfactant added to the polymer latex used in the exfoliation process.

The exfoliation maximization is based, at least in part, upon a destabilization of the elastomer latex particles due to the aforesaid ion exchange phenomenon between particles of an amphiphilic elastomeric copolymer in the latex with cation exchangeable ions within the galleries of the stacked platelets of the water-swellable clay to cause an intercalation/exfoliation of the clay, thereby causing the elastomer particles to coagulate. The relatively bulky amphiphilic coagulated elastomer particles, in turn, enter the galleries of the negatively charged stacked platelets to further expand the distance between the platelets and further promote a bonding of the elastomer particles to the surface of the platelets which consequently results in a more complete exfoliation (delamination) of the platelets.

Moreover, by operation of this invention, a relatively hydrophilic water-swellable clay is substantially converted to more hydrophobic exfoliated platelets, which may include intercalated stacks of platelets, which are more compatible with diene-based elastomers and therefore more suitable for dispersion therein the as particulate reinforcement therefor.

The nanocomposites of this invention may also be used to create rubber composites as blends of such nanocomposites with other elastomers, reinforcing fillers, ingredients and/or coupling agents which may be used as components of articles of manufacture, including tires. Thus such articles of manufactures may be composed of a rubber composition comprised of said nanocomposite and/or said rubber composite.

Indeed, while some aspects of the process might appear to be somewhat simplistic in operational nature, it is considered herein that the overall technical procedural application is novel, a departure from past practice and inventive. This is particularly considered herein to be true where nanocomposites in a form of exfoliated, hydrophobic, platelet reinforced elastomer compositions are desired for use in composites of articles of manufacture such as components for tires.

In practice, the complete exfoliation of the polymer-bound platelets can be determined, for example, by wide angle X-ray diffraction (WAXD) as evidenced by a substantial absence of an X-ray peak. Information concerning the intermediate partially exfoliated/intercalated state within the elastomer matrix can be qualitatively obtained by observing WAXD peak intensities and changes (increase) in the basal plane spacing between platelets.

It is to be appreciated that the preparation of elastomer/clay nanocomposites has been disclosed in WO 2004/078785 and WO 2004/078839. There is no disclosure or suggestion therein that a cationically charged water soluble polyelectrolyte prepared by CFRP/RAFT could be used as a macroinitiator for the synthesis of amphiphilic block copolymer latex containing one or more cationically charged blocks and at least one non-polar block. Furthermore, there is no suggestion or description in either patent, that such a "surfactant-less" core-shell type amphiphilic elastomer latex could be used directly to prepare a polymer-clay nanocomposite rapidly and efficiently by an aqueous coagulative process with a dispersed ion-exchangeable clay.

It is important to appreciate that a significant aspect of this invention is that a multilayered water swellable clay which contains cationically exchangeable ions within the galleries between its layers (e.g. a smectite clay) is intercalated and at least partially, and preferably substantially, exfoliated in the presence of amphiphilic block copolymer latex containing one or more cationically charged blocks and at least one non-polar block to the exclusion of a latex which contains an anionic, cationic, or anionic surfactant, where an enhanced utility in the reinforcement of elastomer compositions is desired to promote enhancement of, for example, one or more elastomeric physical properties such as ultimate tensile strength, modulus (e.g. 300 percent modulus) and/or abrasion resistance properties of a vulcanized elastomer composition, particularly for components of articles of manufacture such as tires and particularly for rubber tire treads.

Multi-layered, stacked clay particles, (e.g. montmorillonite clay) have also reported in U.S. Pat. No. 6,861,462 in which a latex is provided comprised of water, elastomer, cationic surfactant, and layered clay having an interlayer separation and a cationic exchange capacity, wherein layered clay is intercalated by a pre-formed latex via a cation exchange process wherein the latex contains a cationic surfactant.

In the practice of this invention, (to avoid confusion of said U.S. Pat. No. 6,861,462) and contrary to such patent teaching, a nanocomposite of an elastomer matrix and a dispersion therein of exfoliated platelets is required to be prepared by an ion exchange between ion exchangeable ions in the galleries of stacked platelets of a water-swellable clay and cations contained on pre-formed elastomer particles in an elastomer latex of amphiphilic block copolymer containing one or more cationically charged blocks and at least one non-polar block in which the pre-formed latex is spontaneously coagulated.

In particular, for this invention the water-swellable clay is introduced to said latex as a water dispersion of the clay which does not contain an intercalant for the clay so that the clay is not pre-intercalated with an intercalant prior to addition to the latex. The clay, of course, contains cation exchangeable ions within the galleries between the stacked platelets of the clay which are somewhat swollen by the water in which the clay is dispersed prior to its addition to the latex. The latex itself, to which the water dispersion of the clay is added, is required to contain cationically charged elastomer particles which are available for an ion exchange with said cation exchangeable ions in the said galleries within the clay; the cationically charged elastomer particles comprise an amphiphilic block copolymer containing one or more cationically charged blocks and at least one non-polar block.

In one embodiment, the latex of amphiphilic block copolymer latex containing one or more cationically charged blocks and at least one non-polar block is procedurally prepared by controlled free radical emulsion polymerization (CFRP) using a reversible addition-fragmentation (RAFT) macroinitiator. In one embodiment, the latex is preparing using a method comprising the steps of:

(A) preparing a first aqueous polymerization medium which is comprised of
 (1) 4-vinylpyridine,
 (2) a trithiocarbonate RAFT agent, and an emulsifier, wherein the emulsifier is prepared in-situ within the aqueous polymerization medium by the reaction of a latent surfactant with a surfactant activator;

(B) polymerizing the 4-vinylpyridine within the first aqueous polymerization medium in the presence of a first free radical initiator to produce a poly(4-vinylpyridine);

(C) protonating the poly(4-vinylpyridine) to form a protonated poly(4-vinylpyridine) RAFT macroinitiator;

(D) preparing a second aqueous polymerization medium which is comprised of the protonated poly(4-vinylpyridine) RAFT macroinitiator and a monomer containing ethylenic unsaturation but is exclusive of a surfactant; and (E) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation.

By preparing a nanocomposite by blending a water/water-swellable clay dispersion with a latex prepared by the procedure described above, at least partial exfoliation of individual platelets occurs in which the cationically charged block of the amphiphilic block copolymer containing one or more cationically charged blocks and at least one non-polar block latex, ion exchanges with the cation exchangeable ions within the clay platelet galleries and therefore causes the cationically charged block of the amphiphilic block copolymer to enter the galleries and to which the relatively bulky elastomer particles become polymer-bound to the surfaces of the positively charged surfaces of the clay platelets which, in turn causes the galleries to expand and to promote a substantial exfoliation (delamination) of the platelets from the clay as a dispersion thereof into the polymer matrix itself.

Water-swellable clays considered for use in this invention which are clays composed of a plurality of stacked platelets (e.g. very thin silicate based platelets) which contain cationically exchangeable ions in the galleries between such platelets. Representative of such clays are water swellable smectite clays, vermiculite based clays and mica based clays. Preferably such water-swellable clays are smectite clays. Representative of smectite clays are, for example, montmorillonite, hectorite, nontrite, beidellite, volkonskoite, saponite, sauconite, sobockite, sterensite, and sinfordite clays of which montmorillonite and hectorite clays are preferred. For various exemplary smectite clays, see for example U.S. Pat. No. 5,552,469. Such cationically exchangeable ions contained in such galleries are typically comprised of at least one of sodium ions and potassium ions, which may include calcium ions and/or magnesium ions, although it is understood that additional cationically exchangeable ions may be present. Typically, montmorillonite clay is preferred which contains sodium ions in such galleries, although it is understood that a minor amount of additional cationically exchangeable ions may be contained in such galleries such as for example, calcium ions.

Emulsion polymerization derived elastomeric styrene/butadiene copolymers may be typically prepared, for example, by polymerizing the styrene and 1,3-butadiene monomers in a water emulsion medium via a free radical and redox polymerization initiators in the presence of an anionic surfactant. Representative examples of anionic surfactants may be found, for example, in McCutcheon's, Volume 1, "Emulsifiers & Detergents", North American Edition, 2001, Pages 291 and 292, with representative examples on nonionic surfactants shown on Pages 294 through 300 and examples of cationic surfactants shown on Pages 300 and 301.

For the practice of this invention, cationic, anionic, and nonionic surfactants are to be excluded. However, if desired, a minor amount of a surfactant might be used (e.g. from zero to about 20, alternately about 0.1 to about 20 weight percent) of non-ionic surfactant.

Accordingly, an amphiphilic block copolymer elastomer latex of, for example elastomers derived from suitable monomers to yield elastomers such as, for example, poly(4-vinylpyridine)-b-styrene/butadiene rubber, poly(4-vinylpyridine)-b-cis 1,4-polybutadiene rubber and/or poly(4-vinylpyridine)-b-butadiene/acrylonitrile rubber, is required to be made as a result of controlled free radically polymerizing in the presence of a RAFT macroinitiator the elastomer precursor monomers such as, for example, a combination of styrene and 1,3-butadiene monomers, 1,3-butadiene individually, or a combination of 1,3-butadiene and acrylonitrile. Preferably, the elastomer is a styrene/butadiene elastomer.

By requiring an aqueous dispersion of a water-swellable clay (e.g. smectite clay) which does not contain an intercalant (e.g. does not contain a quaternary ammonium salt), in a water-swollen state where the galleries between platelets are expanded somewhat by being swollen with water, to be blended with a pre-formed latex of the amphiphilic block copolymer elastomer particles to cause an ion exchange to occur between the cationically charged blocks of the amphiphilic block copolymer latex and the cationically ion exchangeable ions within the swollen galleries of the clay (e.g. smectite clay), the practice of this invention is significantly different from:

(A) simply requiring a polymerization of the respective monomers to occur in the presence of a smectite clay, whether or not the latex itself is a cationic latex, or (B) simply coagulating the elastomer from an elastomer latex by a typical salt/acid elastomer coagulation method, or (C) simply coagulating a cationic elastomer from an elastomer latex containing a cationic surfactant.

Therefore, for this invention, the smectite clay is intercalated and exfoliated, preferably substantially exfoliated, into platelets, preferably polymer-bound platelets) within the elastomer (A) after the elastomer is pre-formed by copolymerization of monomers such as, for example, styrene and 1,3-butadiene, with a RAFT macroinitiator in a water based medium to form an elastomer latex containing an amphiphilic block copolymer containing one or more cationically charged blocks, and (B) prior to, or simultaneously with, the coagulation of the elastomer from the latex.

Therefore, the water-swellable clay (e.g. smectite clay) is (A) not intercalated during the polymerization of the monomers, (B) not intercalated by physically blending the smectite clay with the elastomer after it has been coagulated and recovered as a dry elastomer and (C) not intercalated by blending a smectite clay which has been pre-intercalated by treatment with a quaternary ammonium salt prior to blending the pre-intercalated clay with the elastomer.

Due to their cationic nature, the cationically charged blocks of the amphiphilic block copolymer containing one or more cationically charged blocks stabilize the elastomer particles in the latex and keep the elastomer particles from coagulating. Further, the cations in the cationically charged blocks undergo an ion exchange with cation exchangeable ions (e.g. sodium ions) within the galleries between the platelets of the smectite clay to cause (A) the cations to be withdrawn from the presence of the cationically charged blocks in the elastomer particles and to thereby destabilize the latex (causing the elastomer particles to coagulate) and (B) substantially essentially simultaneously (during the coagulation process of the elastomer particles) expand the distance between the plates of the clay to form expanded galleries (by exchanging the ions such as sodium ions in the galleries between the stacked platelets of the clay with the more bulky cations from cationically charged blocks of the amphiphilic copolymer) and therefore intercalate and exfoliate the clay and allowing the destabilized elastomer particles to coagulate.

In this manner, then, the method of creating a nanocomposite as a dispersion of intercalated, preferably substantially exfoliated, platelets, preferably polymer-bound platelets, of the clay (e.g. smectite clay) within an elastomer host is considered herein to be novel and a departure from past practice and, moreover, the resulting nanocomposite of the elastomer and dispersion of substantially exfoliated polymer-bound platelets prepared by such process is also novel and a departure from past practice.

Blending of an organoclay with a thermoplastic or thermosetting polymer by a melt blending process is discussed in U.S. Pat. Nos. 4,739,007; 4,810,734; 5,385,776; 5,578,672 and 5,840,796. Blending of an adduct of a mineral filler such as, for example, a montmorillonite clay, and a quaternary ammonium salt with at least one rubber and an organosilane is discussed in U.S. Pat. No. 4,431,755.

A montmorillonite clay may be described, for example, as a naturally occurring clay of a structure which is composed of a plurality of stacked, thin and relatively flat, layers, where such individual layers may be of a structure viewed as being composed of very thin octahedral shaped alumina layer sandwiched between two very thin tetrahedrally shaped silica layers to form an aluminosilicate structure. Generally, for such aluminosilicate structure in the naturally occurring montmorillonite clay, some of the aluminum cations ($Al^{+3}$)

are viewed as having been replaced by magnesium cations (Mg+2) which results in a net negative charge to the platelet layers of the clay structure. Such negative charge is viewed as being balanced in the naturally occurring clay with hydrated sodium, lithium, magnesium, calcium and/or potassium cations, usually primarily sodium ions, within the spacing (sometimes referred to as "galleries") between the aluminosilicate layers, or platelets.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

In one embodiment, a process of preparing a nanocomposite comprised of an elastomer and at least partially exfoliated platelets from a water-swellable clay, (in situ within an elastomer host of cationic elastomer particles), comprises blending:

(A) an aqueous pre-formed elastomer latex comprised of an amphiphilic block copolymer containing one or more cationically charged blocks prepared by aqueous controlled free radical polymerization of monomers in the presence of a RAFT macroinitiator;

(B) an aqueous mixture of water and a multilayered water-swellable clay which contains cationically exchangeable ion in its galleries between said layers, (e.g. smectite clay), exclusive of an intercalant for said clay, wherein said water-swellable clay is comprised of a plurality of stacked platelets with water-swollen (expanded) galleries between said platelets, wherein said galleries contain cationic ion exchangeable ions therein, which may be naturally occurring, (e.g. montmorillonite clay which contains sodium ions within said galleries).

In practice, it is considered that the method relies, at least in part, upon an ion exchange between said cations of the cationically charged blocks of the amphiphilic block copolymer in the elastomer latex and said cationically exchangeable ion(s) in the galleries between the stacked platelets of the clay and to thereby expand the separation between individual platelets of the clay and create at least partially exfoliated platelets and to destabilize and coagulate the elastomer particles from the latex to thereby create a nanocomposite comprised of a dispersion of the at least partially exfoliated platelets within the matrix of the coagulated latex particles.

In one embodiment, the monomers for preparation of the pre-formed amphiphilic block copolymer elastomer may also contain a minor amount (e.g. from about 0.1 to about 20, alternately about 0.1 to about 10, weight percent based on the total monomers) of additional copolymerizable monomers comprised of alkyl acrylates, alkyl methacrylates, acrylamide, methacrylamide, N-alkylacrylamide, N-alkyl methacrylamide, N,N-dialkyl acrylamide and N,N-dialkyl methacrylamide, wherein said alkyl groups contain from one through four carbon atoms; alpha methylstyrene, 2-vinyl pyridine and 4-vinyl pyridine.

Representative examples of said alkyl groups for said additional polymerizable monomers are, for example, methyl, ethyl, propyl and butyl groups.

In one embodiment, the monomers for the preparation of said pre-formed amphiphilic block copolymer elastomer may also contain a minor amount (e.g. from about 0.1 to about 20, alternately about 0.1 to about 10), weight percent based on the total monomers) of an elastomer functionalizing monomer selected from, for example, hydroxypropyl acrylate, hydroxypropyl methacrylate (HPMA), 2-(dimethylamino) ethyl methacrylate, 4-anilinophenyl methacrylamide, 2-hydroxyethyl acrylate and 2-hydroxyethyl methacrylate.

The amount of clay (e.g. smectite clay) to be treated, and therefore the amount of exfoliated polymer-bound platelets to be contained in the nanocomposite, may be limited by the available amount of cationically charged blocks provided by the amphiphilic block copolymer containing at least one cationic block in the elastomer latex.

Therefore, if it is desired to quantitatively surface treat a significant amount of the water-swellable clay (e.g. smectite clay) and the available cationic charged blocks in the amphiphilic block copolymer elastomer latex is insufficient to ion exchange with all, or substantially all, of the cationic ion exchangeable ions within the galleries of the water-swellable clay, then an incomplete surface treatment of the clay will occur. The inherent result is that the resultant nanocomposite may be composed of the elastomer which contains a dispersion thereon of both a surface treated clay and a significant quantity of non-surface treated clay which is considered herein to be effective only as a filler for the elastomer and not an effective particulate reinforcement.

Accordingly, the effective amount of the water-swellable clay (e.g. smectite clay) to be added to the latex for an effective interactive ion exchange between the cationically charges blocks of the amphiphilic block copolymer and cation exchangeable ions within the galleries of the water-swellable clay is limited by the amount of cationically charged blocks in the amphiphilic block copolymer in the formative latex.

In one embodiment, a rubber composite is provided as a blend of at least one additional elastomer and said nanocomposite, as well as a process of preparing a rubber composite by preparing said nanocomposite and then blending at least one elastomer, particularly a diene-based elastomer, therewith.

In one embodiment, an article of manufacture is provided having at least one component comprised of said nanocomposite and/or said rubber composite, as well as a process of preparing an article of manufacture composite by preparing said nanocomposite and/or said rubber composite and then preparing said article of manufacture.

In one embodiment, a tire is provided having at least one component comprised of said nanocomposite and/or said rubber composite. In one aspect of the invention, said component may be, for example, a tire tread, as well as a process of preparing a tire by preparing said nanocomposite and/or said rubber composite and then preparing said tire.

The amphiphilic block copolymer containing at least one cationic block latex is composed of water, elastomer particles, and free radical polymerization initiator. The latex itself is prepared by a controlled free radical polymerization of the monomers in a water-based medium in the presence of a free radical initiator and a RAFT agent.

The present invention includes a method of producing an amphiphilic block copolymer, comprising the steps of:

(A) preparing a first aqueous polymerization medium which is comprised of
  (1) 4-vinylpyridine,
  (2) a trithiocarbonate RAFT agent, and an emulsifier, wherein the emulsifier is prepared in-situ within the aqueous polymerization medium by the reaction of a latent surfactant with a surfactant activator;

(B) polymerizing the 4-vinylpyridine within the first aqueous polymerization medium in the presence of a first free radical initiator to produce a poly(4-vinylpyridine);

(C) protonating the poly(4-vinylpyridine) to form a protonated poly(4-vinylpyridine) RAFT macroinitiator;

(D) preparing a second aqueous polymerization medium which is comprised of the protonated poly(4-vinylpyridine)

RAFT macroinitiator and a monomer containing ethylenic unsaturation but is exclusive of a surfactant; and (E) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation.

The method of the present invention involves two RAFT controlled polymerizations, first, a RAFT controlled polymerization of 4-vinylpyridine following by protonation to produce a protonated poly(4-vinylpyridine) RAFT macroinitiator, and second, a RAFT controlled polymerization of the protonated poly(4-vinylpyridine) RAFT macroinitiator with a second monomer containing ethylenic unsaturation to produce an amphiphilic block copolymer.

The RAFT controlled polymerizations can be a batch, semi-batch, or continuous process which provides excellent control of the polymer composition and morphology. The controlled polymerization will normally be carried out as an emulsion polymerization process.

In the RAFT controlled polymerization of 4-vinylpyridine, a trithiocarbonate RAFT agent is used. Any of the trithiocarbonate RAFT agents as are known in the art may be used, for example, in one embodiment the trithiocarbonate RAFT agent may be as disclosed in U.S. patent application Ser. No. 10/721,718, fully incorporated herein by reference. In another embodiment, the trithiocarbonate RAFT agent is of the structural formula:

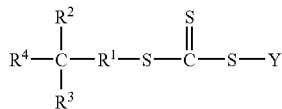

wherein $R^1$ is a divalent alkyl group of 1 to 12 carbon atoms, $R^2$ and $R^3$ are each independently hydrogen or an alkyl group of 1 to 12 carbon atoms, and $R^4$ is —OH or —COOH, with the proviso that the total carbon atoms of $R^1$, $R^2$, and $R^3$ is no greater than 12; and wherein Y represents a functional group that is capable of activating a vinylic carbon toward free radical addition.

In one embodiment, Y represents a functional group selected from the group consisting of —C(R')$_2$CN, —C(CH$_3$)$_2$Ar, —C(CH$_3$)$_2$COOR", —C(CH$_3$)$_2$CONHR", —C(CH$_3$)$_2$CH$_2$C(CH$_3$), —CH(CH$_3$)Ar, —CH$_2$Ar, —C(CH$_3$)$_3$, —CR$_{12}$COOH, —C(R')(CN)—(CH$_2$)$_n$—COOH, and —C(R')(CN)—(CH$_2$)$_n$—OH; wherein R' represents a linear or branched hydrocarbon containing from 1 to 12 carbon atoms; wherein Ar represents an unsubstituted or substituted phenyl, napthyl, anthracenyl, pyrenyl or pyridyl group; and wherein n represents an integer from 1 to 8.

In another embodiment, Y represents a function group selected from the group consisting of benzyl, picolyl, or t-butyl.

In another embodiment, $R^1$ is a divalent alkyl group of 1 to 4 carbon atoms, i.e., $R^1$ is (CH$_2$)$_m$ where m ranges from 1 to 4.

In another embodiment, $R^1$ is (CH$_2$)$_9$, $R^2$ and $R^3$ are hydrogen, $R^4$ is —COOH, Y is benzyl, and the free radical control agent is S-benzyl-S'-(11-undecanoic acid) trithiocarbonate.

In another embodiment, $R^1$ is CH$_2$, $R^2$ is (CH$_2$)$_8$, $R^3$ is hydrogen, $R^4$ is —OH, Y is benzyl, and the free radical control agent is S-benzyl-S'-(2-hydroxydecyl) trithiocarbonate.

In another embodiment, $R^1$ is CH$_2$, $R^2$ is (CH$_2$)$_8$, $R^3$ is hydrogen, $R^4$ is —OH, Y is 4-picolyl, and the free radical control agent is S-(4-picolyl)-S'-(2-hydroxydecyl) trithiocarbonate.

The RAFT controlled polymerization requires the presence of a free radical control agent to control the course of polymerization while minimizing undesirable side reactions, such as chain termination. The control agent has characteristics that depend greatly on the details of the polymerization, including the mechanism for polymerization, the types of monomers being used, the type of initiation, the solvent system and the reaction conditions. The control agent may be introduced into the emulsion system by many different methods, and the preferred method depends greatly on the particular embodiment being practiced. In some embodiments, the active control agent may be added directly to the reaction vessel in the form of a pure compound or as a component of a solution or mixture. In other embodiments, the active control agent may be generated in situ from chemical reactions occurring prior to, during or after emulsification.

Regardless of the method used to introduce or generate a control agent, the control agents suitable for the present invention offer one or more of the benefits associated with "living" polymerization kinetics. These benefits may include:

(A) a linear dependence of the degree of polymerization as a function of time;

(B) a linear dependence of the number-average molecular weight (Mn) on the extent of polymerization;

(C) a constant number of polymer molecules and active centers that is sensibly independent of conversion;

(D) a narrow molecular weight distribution, with Mw/Mn generally less than 2, preferably between 1.1 and 1.8, and often below 1.4; and (E) essentially complete conversion of monomer to polymer with the ability to continue polymerization upon addition of more monomer.

All polymerization reactions must be initiated. For some monomers, such as styrene for example, thermal self-initiation can occur without the need for additional reagents. For many other monomers, initiation may be accomplished by adding an agent to trigger one or more chemical reactions that ultimately produces an intermediate capable of propagating polymerization. These agents often are referred to as "initiators."

The type of initiators suitable for the present invention depend greatly on the details of the polymerization, including the mechanism for polymerization, the types of monomers being used, the type of control agent, the solvent system and the reaction conditions. Many different types of initiators have been investigated.

The initiator may be an initiator for polymerization by a free radical mechanism, such as RAFT or a related mechanism involving stable free radicals. Typically, suitable initiators for free radical polymerization are reagents or combinations of reagents that are capable of producing free radicals. Other methods for producing free radicals, including exposure to ionizing radiation ($^{60}$Co γ-rays), photochemical reactions, or sonication, will be evident to those of skill in the art as suitable methods for initiating free radical polymerization.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

Polymerization can also be initiated with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisisobutyronitrile (AIBN), are preferred for use in generating free radicals.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

An important aspect of the present invention is in-situ emulsification, which is achieved by reacting a "latent surfactant" with a "surfactant activator" to produce the surfactant for controlled emulsion polymerization. As used herein, the term "latent surfactant" refers to a compound or mixture of compounds that: (i) is soluble in a monomer-containing solution that is not miscible with water; and (ii) is not independently capable of producing a stabilized colloidal microemulsion at conventional surfactant levels from simple gentle mixing of the compound or mixture of compounds with monomer-containing solution and water. The term "surfactant activator" is used herein to describe a compound or mixture of compounds that: (i) is soluble in water; and (ii) is not independently capable of producing a stabilized colloidal microemulsion at conventional surfactant levels from simple gentle mixing of the compound or mixture of compounds with monomer-containing solution and water. For the present invention, water can be a reactant for in-situ emulsification reactions, but water alone cannot be the surfactant activator. The use of an in-situ emulsification technique in a controlled polymerization process that can be used in accordance with this invention is described in U.S. patent application Ser. No. 10/721,718, filed on Nov. 25, 2003. The teachings of U.S. patent application Ser. No. 10/721,718 are incorporated herein by reference in their entirety.

The fundamental principles for in-situ microemulsification are described by Prokopov and Gritskova (*Russ. Chem.*, Rev 2001, 70, 791), who review its use in conventional free-radical polymerization of styrene using alkali-metal soaps prepared in situ via neutralization of fatty acids. As explained by Prokopov and Gritskova, the preparation of a carboxylate soap at a styrene-water interface during emulsification can produce a fine microemulsion because interfacial tension is decreased significantly by an abundance of emulsifier produced at the interface. By varying the nature of the carboxylic acid and the metal counter-ion used in the surfactant synthesis at the interface, it was possible to control the degree of dispersion and stability of the emulsion, as well as the resulting polystyrene latex produced via conventional free radical polymerization. In the present invention, the principles of in-situ microemulsification are expanded broadly to produce emulsions suitable for controlled polymerization via a wide range of methods utilizing conventional soap levels without added hydrophobes or specialized emulsification equipment.

In some embodiments, the surfactant for controlled polymerization may be produced by an acid/base neutralization reaction at the monomer/water interface. For some types of anionic surfactants, this may be accomplished, for example, via reaction of a monomer-soluble acid with an aqueous base, where the monomer-soluble acid is the latent surfactant and the base is the surfactant activator for in-situ emulsification. Suitable monomer-soluble acids include, for example, palmitic acid, oleic acid, dodecylbenzene sulfonic acid, lauryl sulfate, hexadecylsulfonic acid, dihexadecylphosphonic acid, hexadecylsuccinate half ester, and the monohexadecylamide of succinic acid. Suitable bases include, for example, hydroxides, carbonates and bicarbonates of alkali metal ions and quaternary ammonium ions, substituted and unsubstituted amines, and basic nitrogen-containing heterocycles. It will be evident to those skilled in the art that any aqueous base with a pKb less than about the pKa of the monomer-soluble acid also may be suitable. It also will be evident that hydroxides generated in situ via hydrolysis of moisture-sensitive compounds, such as sodium methoxide, sodium amide, potassium hydride and the like, also may be suitable as surfactant activators.

Many other reactions can be used to synthesize surfactants in situ, including for example those described in U.S. patent application Ser. No. 10/721,718 and the specific embodiments illustrated above are not intended to preclude any combination of latent surfactant/surfactant activator that produces a surfactant during emulsification. It will be evident to those skilled in the art that other latent surfactant/surfactant activator combinations may be suitable when the chemistries of surfactant synthesis and controlled polymerization are compatible.

The poly(4-vinylpyridine) produced by RAFT controlled polymerization in the presence of the RAFT agent may be isolated from the first polymerization medium using methods as are known in the art, including but not limited to filtration, dissolution and crystallization. The poly(4-vinylpyridine) is then protonated to produce a protonated poly(4-vinylpyridine) RAFT macroinitiator. Protonation of the poly(4-vinylpyridiene) may be accomplished, for example, using strong mineral acid such as hydrochloric acid and the like. The protonation may be accomplished by solubilization of the poly(4-vinylpyridine) in aqueous solution of the acid.

The protonated poly(4-vinylpyridine) RAFT macroinitiator is utilized in a second polymerization with at least one monomer containing ethylenic unsaturation to produce an amphiphilic block copolymer.

Suitable monomers containing ethylenic unsaturation for use in the second polymerization include at least one monomer selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N,N-dialkylacrylamide, N,N-dialkylmethacrylamide, isoprene, 1,3-butadiene, ethylene, vinyl acetate, vinyl chloride, vinylidene chloride, and combinations thereof. Functionalized versions of these monomers may also be used. Specific monomers or co-monomers that may be used in this invention and from which M is derivable include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), α-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl)ethyl 2-methyl-2-propenoate, 1-[2-[2-hydroxy-3-(2-propyl)propyl]amino]ethyl-2-imidazolidinone, N-vinyl pyrrolidone, N-vinyl imidazole, crotonic acid, vinyl sulfonic acid, and combinations thereof.

In one embodiment, the monomer including ethylenic unsaturation is selected from styrene, isoprene and butadiene. In one embodiment, the monomer including ethylenic unsaturation is selected from styrene and butadiene.

An important aspect of the present invention lies in the "surfactantless" nature of the second polymerization step. That is, no additional surfactant either generated in-situ or otherwise, is present in the second polymerization step. The protonated poly(4-vinylpyridine) RAFT macroinitiator acts during the polymerization to produce a self-stabilizing block copolymer latex, without the need for additional surfactants as is the usual case.

The second polymerization is carried out at a temperature less than 100° C. This is an advantage over systems requiring higher reaction temperatures, owing to their more costly processing equipment and higher energy input.

The latex containing the amphiphilic block copolymer is combined with a dispersion of the clay to form the nanocomposite.

The water-based dispersion of the multi-layered smectite clay is required to be exclusive of a intercalant (e.g. quaternary ammonium salt) so that intercalant-induced intercalation of the smectite clay occurs after a water dispersion of the smectite clay is mixed with the aqueous amphiphilic block copolymer emulsion.

The smectite clay (e.g. montmorillonite clay) becomes more compatible with the elastomer (e.g. styrene/butadiene elastomer) host after its intercalation to a more hydrophobic form of the smectite clay, in situ within the elastomer host latex, as the intercalation of the smectite clay and coagulation of the elastomer from the latex occur substantially simultaneously. It is considered herein to be important that such intercalation of the smectite clay and coagulation of the already-formed elastomer occurs in this manner, instead of simply polymerizing the monomers to form the elastomer(s) in the presence of the clay followed by coagulation of the elastomer. Therefore, by the practice of this invention, it is considered herein that enable a more efficient intercalation flexibility is enabled by first producing the elastomer in a form of a latex and then producing the nanocomposite.

The intercalation of the water-swellable clay (e.g. smectite clay) and substantially simultaneous coagulation of elastomer from the latex may be conducted, for example, by slowly adding the elastomer latex to the aqueous water-swellable clay dispersion, while agitating the clay/water dispersion. Such addition is considered herein to enable a good contact between the latex particles and water-swollen water-swellable clay particles.

The clay/water does not contain an intercalant (e.g. does not contain a quaternary ammonium salt) to promote an ion exchange with sodium ions contained between the stacked layers of the water-swellable clay, although it is contemplated that the water-swellable clay in the water is in a water-swelled state so that the galleries between the stacked platelets are somewhat enlarged. For such procedure, the latex may be added, for example, at a temperature of about 20° C. to about 30° C. to an agitated dispersion of the clay in water having an elevated temperature in a range of about 40° C. to about 80° C. because it is considered herein that the clay is dispersed more readily in water at an elevated temperature. Such utilization of a clay/water dispersion at the elevated temperature, which is preferably at least 40° C. above the temperature of the latex being added to the dispersion, is considered herein to be useful in promoting a more efficient and substantially simultaneous combination of (A) the ion transfer mechanism of the cationically exchangeable ions (e.g. sodium ions) in the galleries between the stacked platelets of the water-swellable clay and the cationic surfactant, (B) a destabilization of the elastomer latex and thereby the elastomer particles, (C) the migration of the elastomer particles into the galleries between the platelets of the swollen, intercalated clay to aid in forming polymer-bound platelets (D) and a substantial exfoliation of the polymer-bound platelets within the elastomer host and (E) coagulation of the elastomer particles from the destabilized elastomer latex.

The substantially simultaneous effect of such steps, although a portion of the steps may be somewhat partially sequential in nature, is seen herein as promoting a more efficient cationic intercalation of the clay and substantial exfoliation of polymer-bound platelets and to effect a more efficient homogeneous dispersion of the intercalated clay and substantially exfoliated polymer-bound platelets thereof which may be the most significant resultant aspect of the invention for the formation of the thereby enhanced nanocomposite of this invention.

The resulting nanocomposite may be blended with additional elastomers to create a rubber composite. For example, rubber composites may be prepared by blending the nanocomposite with various additional diene-based elastomers such as, for example, homopolymers and copolymers of monomers selected from isoprene and 1,3-butadiene and copolymers of at least one diene selected from isoprene and 1,3-butadiene and a vinyl aromatic compound selected from styrene and alpha methylstyrene, preferably styrene.

Representative of such additional conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In one embodiment, particulate reinforcement for the nanocomposite and/or rubber composite, particularly the exfoliated platelets, may also include carbon black and/or particulate synthetic amorphous silica, particularly precipitated silica, or a combination of carbon black and such amorphous silica, usually of an amount in a range of about 5 to about 100 alternately about 5 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

In one embodiment, a rubber composition is provided which comprises, based upon parts by weight per 100 parts by weight elastomer (phr):

(A) about 5 to about 150, alternately about 5 to about 115, phr of the nanocomposite of this invention, (B) from zero to about 95, alternately from about 5 to about 95, phr of at least one additional diene-based elastomer, so long as the total of the elastomer contained in said nanocomposite and said additional diene-based elastomer is 100 parts by weight, (C) from zero to about 80, alternately from about 10 to about 80, alternately about 10 to about 60 phr of at least one additional reinforcing particulate filler selected from carbon black, precipitated silica aggregates, silica-containing carbon black which contains domains of silica on its surface, and mixtures thereof, and, optionally (D) a coupling agent which contains a moiety reactive with hydroxyl groups (e.g. silanol groups) contained on the peripheral edges of the surface of the platelets of said exfoliated platelets and reactive with hydroxyl groups (e.g. silanol groups) contained on the surface of said precipitated silica and said silica-containing carbon black, if said silica and/or silica-containing carbon black is used, and another moiety which is interactive with said diene-based elastomer(s) of the elastomer(s) of said nanocomposite and at least one of said additional elastomers.

Commonly employed synthetic amorphous silica, or siliceous pigments, used in rubber compounding applications can be used as the silica in this invention, wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the Journal of the *American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 cm3/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from Degussa AG with, for example, designations VN2, VN3 and Ultrasil 7005, as well as other grades of silica, particularly precipitated silicas, which can be used for elastomer reinforcement.

As hereinbefore discussed, various coupling agents may be used if desired. For example, a bis(3-trialkoxysilylalkyl) polysulfide having an average of 2 to 2.6 or of 3.5 to 4 connecting sulfur atoms in its polysulfide bridge, preferably from 2 to 2.6 sulfur atoms, may be used and particularly a bis(3-triethoxysilylpropyl) polysulfide.

It is readily understood by those having skill in the art that the nanocomposite, or rubber composite, would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is typically conducted in the presence of a sulfur vulcanizing agent, although peroxide and other non-sulfur curing agents may sometimes be suitably employed to vulcanize the elastomers. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to preparation of nanocomposites as well as rubber composites which contain such nanocomposites as well as manufactured articles, including tires, which have at least one component comprised of said nanocomposites and/or rubber composites. An extensive listing of potential applications and uses of polymer-clay nanocomposite compositions can be found in WO 2004/078785 Pages 32-36. Additional uses not covered in this reference would be in tires, belts, hose etc. where physical and dynamic mechanical properties can be improved. Ideally, one would like to effectively use polymer-clay nanocomposites to reduce weight and lower compound hysteresis.

The preparation of a rubber composite, namely the mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE 1

Preparation of Poly(4-vinylpyridine) By "In-situ" Emulsification Method with Dibenzyltrithiocarbonate (DBTTC) RAFT Agent A 500 ml three-necked round bottom flask equipped with a mechanical paddle stirrer, a nitrogen inlet, a pot thermometer, heating mantle and condenser was charged with 1.33 g (~0.00459 moles) of dibenzyltrithiocarbonate, 60.0 g (~0.57 moles) of distilled 4-vinylpyridine and 3.6 g (~0.0127 moles) of oleic acid. The stirred reactor was then purged with a slow bleed of nitrogen before adding an aqueous solution prepared by dissolving 0.36 g (~0.00133 moles) of potassium persulfate, 0.88 g (~0.0083 moles) of sodium carbonate, 0.88 g (~0.010 moles) of sodium bicarbonate and 0.82 g (~0.0126 moles) of potassium hydroxide in 158 g of reverse osmosis (RO) treated water. A yellow emulsion forms immediately. The emulsion is then rapidly heated to 65° C. and held there with the aid of a thermowatch controller. The progress of the polymerization was followed gravimetrically. After one hour the percent latex solids were 22.6 percent or 75 percent conversion. After 1.5 hours, the emulsion began to destabilized. Heating was continued for a total of 4 hrs. The resulting mixture was biphasic with a very viscous orange polymeric lower phase and an almost clear upper aqueous phase. The upper was decanted off and the lower polymer phase washed several times with water. After removing the excess water, the lower polymer phase was dissolved in ~200 ml of methanol. 290 g of methanol solution were isolated with a solids content of 20.0 percent. This represents a polymer yield of 58.0 g or 94.5 percent conversion of the 4-vinylpyridine. The theoretical Mn is 13,300 while the approximate Mn determined by NMR was ~11,000.

EXAMPLE 2

Preparation of Poly(4-vinylpyridine) By "In-situ" Emulsification Method with S-Benzyl-S'-(2-hydroxydecyl)trithiocarbonate (BHDTTC) RAFT Agent Procedure: same as Ex. 1 except that 1.80 g (~0.00464 moles) of BHDTTC RAFT agent used in place of DBTTC. After a 4 hr. reaction time at 65° C., the reaction was worked up in an identical manner to Ex. 1. 289 g of methanol solution at 19.66 percent solids represents 56.8 g of poly(4-vinylpyridine) or 92 percent conversion.

EXAMPLE 3

Preparation of Poly(4-VP+-b-PS-b-4-VP+) Triblock Copolymer Latex 50.0 g of 20 percent poly(4-vinylpyridine) methanol solution from Ex. 1 (~10.0 g of polymer) was placed in a 500 ml single neck flask and stripped of solvent on a rotary evaporator. To the dried polymer was then added 110 g of RO water and 10.0 g of con. hydrochloric acid. The mixture was stirred until a uniform pale yellow aqueous solution was obtained. This solution was then charged into a 500 ml three-necked round bottom flask equipped with a mechanical paddle stirrer, a nitrogen inlet, a pot thermometer, heating mantle and condenser. 0.6 g of potassium persulfate was then added followed by 30.0 g (~0.288 moles) of styrene. The biphasic stirred mixture was then rapidly heated to 65° C. under nitrogen for 8 hrs. The final latex solids were then determined to be 26.7 percent (theory 27.1 percent) or 98.5 percent conversion. A small portion of the final latex was coagulated in dilute potassium hydroxide solution for analysis. NMR indicated a composition of 25.8 percent poly(4-VP) and 74.2 percent polystyrene (theory 25 percent poly(4-VP) and 75 percent PS). Latex particle size was ~182 nm.

EXAMPLE 4

Preparation of Poly(4-VP+-b-PS) Diblock Copolymer Latex 50.5 g of 19.66 percent poly(4-vinylpyridine) methanol solution from Ex. 2 (~10.0 g of polymer) was placed in a 500 ml single neck flask and stripped of solvent on a rotary evaporator. To the dried polymer was then added 110 g of RO water and 10.0 g of con. hydrochloric acid. The mixture was stirred until a uniform pale yellow aqueous solution was obtained. This solution was then charged into a 500 ml three-necked round bottom flask equipped with a mechanical paddle stirrer, a nitrogen inlet, a pot thermometer, heating mantle and condenser. 0.43 g of potassium persulfate was then added followed by 30.0 g (~0.288 moles) of styrene. The biphasic stirred mixture was then rapidly heated to 65° C. under nitrogen. After only 2 hrs., the latex solids were determined to be 27 percent (theory 27.1 percent) or ~100 percent conversion. A small portion of the final latex was coagulated in dilute potassium hydroxide solution for analysis. NMR indicated a composition of 24.8 percent poly(4-VP) and 75.2 percent polystyrene (theory 25 percent poly(4-VP) and 75 percent PS). Latex particle size was 150 nm.

EXAMPLE 5

Repeat Preparation of Poly(4-vinylpyridine) By "Insitu" Emulsification Method with S-Benzyl-S'-(2-hydroxydecyl)trithiocarbonate (BHDTTC) RAFT Agent Procedure: same as Ex. 2 except at 2.23 scale factor. After a 4 hr. reaction time at 65° C., the reaction was worked up in an identical manner to Ex. 1. 505 g of methanol solution at 24.4 percent solids represents 123.2 g of poly(4-vinylpyridine) or 92 percent conversion.

EXAMPLE 6

Preparation of Poly(4-VP+-b-PS-b-NIPAM) Triblock Copolymer Latex 41 g of 24.4 percent poly(4-vinylpyridine) methanol solution from Ex. 5 (~10.0 g of polymer) was placed in a 500 ml single neck flask and stripped of solvent on a rotary evaporator. To the dried polymer was then added 110 g of RO water and 10.0 g of con. hydrochloric acid. The mixture was stirred until a uniform pale yellow aqueous solution was obtained. This solution was then charged into a 500 ml three-necked round bottom flask equipped with a mechanical paddle stirrer, a nitrogen inlet, a pot thermometer, heating mantle and condenser. 0.43 g of potassium persulfate was then added followed by 30.0 g (~0.288 moles) of styrene. The biphasic stirred mixture was then rapidly heated to 70° C. under nitrogen. After 3 hrs., the latex solids were 28.1 percent indicating essentially complete styrene conversion. At this point, 10.0 g (0.088 moles) of N-isopropylacrylamide monomer (NIPAM) were added to the hot latex and the reaction continued for an additional 2.5 hrs. The latex became very thick and was allowed to stand at room temperature overnight. The latex was then diluted with 100 ml of water and coagulated in dilute potassium hydroxide solution. After filtering, washing and drying, 47.5 g of polymer was isolated (theory 50.0 g) or 95 percent conversion. Dried material was completely soluble in dichloromethane. NMR analysis gave a wt percent composition of 18.7 percent 4-VP; 61.9 percent styrene; and 19.4 percent NIPAM. Calculated values are 20/60/20. SEC analysis against a polystyrene standard showed a unimodal peak with an Mn of 374,000 and a PDI of 1.47.

EXAMPLE 7

Preparation of Poly(4-VP+-b-SBR) Diblock Copolymer Latex 483 g of the methanol solution from Ex. 5 were stripped of the solvent and the residue dissolved in 1300 ml of RO water containing 118 g of conc. hydrochloric acid to prepare a 9.9 percent aq. solution of the protonated water-soluble poly(4-vinylpyridine) RAFT macroinitiator. One gram of potassium persulfate was then dissolved in 252.5 g of the 9.9 percent aq. macroinitiator solution (~25 g polymer). This solution was then charged into a one quart heavy-walled bottle preflushed with nitrogen, followed by the addition of 60.0 g (0.577 moles) of styrene and 90.0 g (~1.67 moles) of butadiene. The bottle was then capped and tumbled in a 65° C. water bath. The progress of the reaction was monitored gravimetrically by periodically sampling solids content by means of a syringe needle through a gasketed hole in the metal cap. After 23 hrs., the bottle was removed from the bath and cooled to room temperature to stop polymerization. The solids content was determined to be 32.3 percent or ~70 percent conversion of the styrene and butadiene.

EXAMPLE 8

Preparation of Poly(2-vinylpyridine) by Solution Polymerization Method with S-Benzyl-S'-(dodecyl) trithiocarbonate (BDTTC) RAFT Agent To a 500 mL round bottom flask equipped with mechanical stirrer, thermometer, and nitrogen inlet was charged 133 g 2-propanol, 65.5 g (620 mmoles) of 2-vinylpyridine, and 11.5 g (42 mmoles) of S-benzyl-S'-(dodecyl)trithiocarbonate. Flask was flushed with nitrogen and 1.5 g (6.1 mmoles) of 1,1'-azobis(cyclohexanecarbonitrile) in 23 g toluene. Solution was heated to reflux for 210 minutes. The final solids was 31.7 percent or a conversion of 95 percent, theoretical Mn was 2,470 experimental SEC Mn 2,940 g/mol.

EXAMPLE 9

Preparation of Poly(4-vinylpyridine) by Solution Polymerization Method with S-Benzyl-S'-(dodecyl) trithiocarbonate (BDTTC) RAFT Agent To a 500 mL round bottom flask equipped with mechanical stirrer, thermometer, and nitrogen inlet was charged 150 g 2-propanol, 55 g (524 mmoles) of 4-vinylpyridine, and 9.25 g (25 mmoles) of S-benzyl-S'-(dodecyl)trithiocarbonate and 0.63 g (4.4 mmoles) of 2,2'-azobis(2-methylpropionitrile). Solution was heated to reflux for 180 minutes. Solvent was evaporated off, yield 58.1 (91 percent). The theoretical Mn was 2,570, experimental SEC Mn 2,738 g/mol.

EXAMPLE 10

Preparation of Poly(2-VP+-b-ESBR) Copolymer Latex

Experiment was run in duplicate. To a 750 milliliter champagne bottle was charged a solution of 11.25 g of poly(2-vinylpyridine), 11.25 g of concentrated hydrochloric acid, 175 g of water, 1.5 g of potassium persulfate. The bottle was flushed with nitrogen and 60 g styrene followed by 90 g of butadiene was added. The bottles were capped, placed in a 65° C. water bath and tumbled for 21 hours. Percent solids were unchanged indicating no reaction occurred.

EXAMPLE 11

Preparation of Poly(2-VP+-b-ESBR) Copolymer Latex

Similar to Ex. 10 except 75 g styrene and 75 g of butadiene were charged. Percent solids were unchanged indicating no reaction occurred.

EXAMPLE 12

Preparation of Poly(4-VP+-b-ESBR) Copolymer

Experiment was similar to Ex. 10 except 11.25 g of poly (4-vinylpyridine) was charged. The final solids were 10 wt percent or 28 percent conversion of styrene and butadiene. Samples were combined and vented to release butadiene. Then 1000 mL water added and stripped under vacuum to remove residual styrene. The latex had a volume average particle diameter of 121 nm by light scattering.

To isolate the polymer 250 g latex was added with stirring to a coagulant of one part of Wingstay L dispersion, 20 g potassium hydroxide and 1200 mL of water. The crumb was filtered and dried under vacuum 25 millimeter Hg and 45° C. Isolated 58 grams of block copolymer. The Mn was 10,500 g/mol with PDI of 1.23. The glass transition range was −56.2 to −47.7° C.

EXAMPLE 13

Preparation of Poly(4-VP+-b-ESBR) Copolymer

Experiment was similar to Ex. 12. The latex had a volume average particle diameter of 127 nm by light scattering. Isolated 64 grams block copolymer. The Mn was 11,200 g/mol with PDI of 1.38. The glass transition range was −45.9 to −34.5° C.

EXAMPLE 14

Formation of Polymer-Clay Nanocomposite by Coagulative Precipitation of Poly(4-VP+-b-SBR) Diblock Copolymer Latex with an Aqueous Dispersion of Sodium Montmorillonite A one liter beaker was charged with 20.0 g of latex from Ex. 7 (~5.9 g rubber) and diluted with 300 ml of water. To the mechanically stirred latex was then added ~0.5 g of a 50 percent active phenolic AO dispersion. In another one liter beaker was weighed 320 g of a 2.64 wt. percent dispersion of sodium montmorillonite (NaMMT) from Southern Clay Products. The clay dispersion was then diluted with 320 g of water to obtain a 1.32 wt. percent clay dispersion. The dilute clay slurry was then slowly added to the stirred latex at ambient temperature until the serum was clear. * Note: The "clearing" point is somewhat difficult to see due to the fine nature of the precipitate. By this technique, the clearing point was determined to require approximately 296 g of the 1.32 wt. percent clay slurry or a total of 3.9 g of clay. The polymer-clay nanocomposite was then filtered off, washed extensively with water and dried in a circulating air oven at 50° C. overnight to give 10.9 g of a very hard granular gray material (theory ~9.3 g).

EXAMPLE 15

Formation of Polymer-Clay Nanocomposite by Coagulative Precipitation of Poly(4-VP+-b-SBR) Diblock Copolymer Latex with an Aqueous Dispersion of Sodium Montmorillonite followed by Over Coagulation with SBR Latex A one liter beaker was charged with 20.0 g of latex from Ex. 7 (~5.9 g rubber) and diluted with 300 ml of water. To the mechanically stirred latex was then added ~0.5 g of a 50 percent active phenolic AO dispersion. In another one liter beaker was weighed 320 g of a 2.64 wt. percent dispersion of sodium montmorillonite (NaMMT) from Southern Clay Products. The clay dispersion was then diluted with 320 g of water to obtain a 1.32 wt. percent clay dispersion. The dilute clay slurry was then slowly added to the stirred latex at ambient temperature until the serum was clear. * Note: The "clearing" point is somewhat difficult to see due to the fine nature of the precipitate. By this technique, the clearing point was determined to require approximately 296 g of the 1.32 wt. percent clay slurry or a total of 3.9 g of clay. The fine particles formed were allowed to stand at room temperature overnight. Some settling took place during this period revealing a clear serum aqueous layer on top. The suspension was then transferred into a large stainless steel beaker and diluted with 1200 ml of water containing 1.8 g of sodium chloride. The pH of the mixture was adjusted to 2.5-3.0 with the addition of dilute hydrochloric acid. In a separate beaker, 297 g of a 21.3 percent solids SBR 1502 latex (~63 g rubber) containing approximately 1 phr of a 50 percent aqueous dispersion of a phenolic AO was weighed out. This latex was then slowly added to the stirred polymer-clay nanocomposite particles while keeping the pH in the 2-3 range with dilute hydrochloric acid. As the SBR coagulation proceeded, the original fine nanocomposite grew in size. The final crumb size was fairly uniform in the range of several millimeters. The crumb was filtered with a 100 mesh screen, washed with water and dried in a circulating air oven at 50° C. overnight to give 83.4 g of polymer-clay nanocomposite containing roughly 4.67 wt. percent clay.

EXAMPLE 15

Mechanical Properties Of Polymer-Clay Nanocomposite of Ex. 14

The masterbatch of ~5 phr clay with poly-(4-vinylpyridine-b-SBR) copolymer was mixed in a model formulation using a small lab mixer and the basic mechanical properties measured. Compared to the same formulation with CAM as a control (conventional emulsion SBR PLF1502/clay masterbatch), at equal clay loading, the poly-(4-vinylpyridine-b-

SBR) exhibited 24 percent higher storage modulus with equal tan delta, 22 percent higher large strain (300 percent) modulus and 10 percent higher tensile strength with slightly lower elongation at break. These improvements are attributed to a strong interaction between clay platelets and the protonated vinylpyridine block.

While certain representative embodiments and details have been shown for the purpose of illustrating the invention, it will be apparent to those skilled in this art that various changes and modifications may be made therein without departing from the spirit or scope of the invention and the following claims.

What is claimed is:

1. A method of preparing a nanocomposite comprised of an elastomer and at least partially exfoliated platelets from a water-swellable clay which comprises blending:
   (A) an aqueous latex comprised of an amphiphilic block copolymer prepared by
      (1) preparing a first aqueous polymerization medium which is comprised of
         (a) 4-vinylpyridine,
         (b) a trithiocarbonate RAFT agent, and an emulsifier, wherein the emulsifier is prepared in-situ within the aqueous polymerization medium by the reaction of a latent surfactant with a surfactant activator;
      (2) polymerizing the 4-vinylpyridine within the first aqueous polymerization medium in the presence of a first free radical initiator to produce a poly(4-vinylpyridine);
      (3) protonating the poly(4-vinylpyridine) to form a protonated poly(4-vinylpyridine) RAFT macroinitiator;
      (4) preparing a second aqueous polymerization medium which is comprised of the protonated poly(4-vinylpyridine) RAFT macroinitiator and a monomer containing ethylenic unsaturation but is exclusive of a surfactant; and
      (5) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation;
   (B) an aqueous mixture of water and a multilayered water-swellable clay which contains cationically exchangeable ions in its galleries between said layers, exclusive of an intercalant for said clay, wherein said water-swellable clay is comprised of a plurality of stacked platelets with water-swollen galleries between said platelets, wherein said galleries contain cationic ion exchangeable ions therein.

2. The method of claim 1, wherein the trithiocarbonate RAFT agent is of the structural formula:

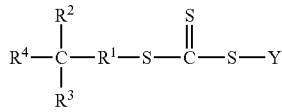

wherein $R^1$ is a divalent alkyl group of 1 to 12 carbon atoms, $R^2$ and $R^3$ are each independently hydrogen or an alkyl group of 1 to 12 carbon atoms, and $R^4$ is —OH or —COOH, with the proviso that the total carbon atoms of $R^1$, $R^2$, and $R^3$ is no greater than 12; and wherein Y represents a functional group that is capable of activating a vinylic carbon toward free radical addition.

3. The method of claim 2 wherein Y represents a functional group selected from the group consisting of —C(R')$_2$CN, —C(CH$_3$)$_2$Ar, —C(CH$_3$)$_2$COOR", —C(CH$_3$)$_2$CONHR", —C(CH$_3$)$_2$CH$_2$C(CH$_3$), —CH(CH$_3$)Ar, —CH$_2$Ar, —C(CH$_3$)$_3$, —CR'$_2$COOH, —C(R')(CN)—(CH$_2$)$_2$—COOH, and —C(R')(CN)—(CH$_2$)$_n$—OH; wherein R' represents a linear or branched hydrocarbon containing from 1 to 12 carbon atoms; wherein Ar represents an unsubstituted or substituted phenyl, napthyl, anthracenyl, pyrenyl or pyridyl group; and wherein n represents an integer from 1 to 8.

4. The method of claim 2 wherein $R^1$ is (CH$_2$)$_m$ where m ranges from 1 to 4.

5. The method of claim 2 wherein Y represents a function group selected from the group consisting of benzyl, picolyl, and t-butyl.

6. The method of claim 2, wherein $R^1$ is (CH$_2$)$_9$, $R^2$ and $R^3$ are hydrogen, $R^4$ is —COOH, Y is benzyl, and the free radical control agent is S-benzyl-S'-(11-undecanoic acid) trithiocarbonate.

7. The method of claim 2, wherein $R^1$ is CH$_2$, $R^2$ is (CH$_2$)$_8$, $R^3$ is hydrogen, $R^4$ is —OH, Y is benzyl, and the free radical control agent is S-benzyl-S'-(2-hydroxydecyl) trithiocarbonate.

8. The method of claim 2, wherein $R^1$ is CH$_2$, $R^2$ is (CH$_2$)8, $R^3$ is hydrogen, $R^4$ is —OH, Y is 4-picolyl, and the free radical control agent is S-(4-Picolyl)-S'-(2-hydroxydecyl) trithiocarbonate.

9. The method of claim 2, wherein the at least one monomer is butadiene and the amphiphilic block copolymer is poly(4-vinylpyridene-b-butadiene).

10. The method of claim 1 wherein the at least one monomer comprises butadiene and styrene and the amphiphilic block copolymer is poly (4-vinylpyridene-b-styrenebutadiene).

11. The method of claim 1 wherein said water swellable clays are selected from at least one of water-swellable smectite clays, vermiculite based clays and mica based clays.

12. The method of claim 1 wherein said water-swellable clay is a smectite clay selected from at least one of montmorillonite, hectorite, nontrite, beidellite, volkonskoite, saponite, sauconite, sobockite, sterensite, and sinfordite clays.

13. A nanocomposite prepared by the method of claim 1.

14. A nanocomposite prepared by the method of claim 2.

15. A rubber composite comprised of a blend of said nanocomposite of claim 13 and additional elastomer(s) and/or additional particulate reinforcing filler.

16. A rubber composite comprised of a blend of said nanocomposite of claim 14 and additional elastomer(s) and/or additional particulate reinforcing filler.

17. A rubber composition which comprises, based upon parts by weight per 100 parts by weight elastomer (phr):
   (A) about 5 to about 150 phr of the nanocomposite of claim 13,
   (B) from zero to about 95 phr of at least one additional diene-based elastomer, so long as the total of the elastomer contained in said nanocomposite and said additional diene-based elastomer is 100 parts by weight,
   (C) from zero to about 80 phr of at least one additional reinforcing particulate filler selected from carbon black, precipitated silica aggregates, silica-containing carbon black which contains domains of silica on its surface, and mixtures thereof, and, optionally
   (D) a coupling agent which contains a moiety reactive with hydroxyl groups (e.g. silanol groups) contained on the peripheral edges of the surface of the platelets of said exfoliated platelets and reactive with hydroxyl groups (e.g. silanol groups) contained on the surface of said precipitated silica and said silica-containing carbon black, and another moiety which is interactive with said diene-based elastomer(s) of the elastomer(s) of said nanocomposite and at least one of said additional elastomers if said additional elastomer is used.

18. The rubber composition of claim 17 wherein said additional conjugated diene-based elastomers are selected from at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers.

19. An article of manufacture having at least one component comprised of
  (A) said nanocomposite of claim 13, or
  (B) a blend of said nanocomposite of claim 13 and at least one additional elastomer and/or reinforcing filler.

20. A tire having at least one component comprised of:
  (A) said nanocomposite of claim 13, or
  (B) a blend of said nanocomposite of claim 13 and at least one additional elastomer and/or reinforcing filler.

\* \* \* \* \*